United States Patent [19]

Biorcio et al.

[11] Patent Number: 4,526,912
[45] Date of Patent: Jul. 2, 1985

[54] PHENOXY RESINS AND USE THEREOF IN ELECTRIC INSULATION

[75] Inventors: Luciano Biorcio; Carlo Mensi, both of Alessandria, Italy

[73] Assignees: The P. D. George Co., St. Louis, Mo.; Industrie Vernici Italiane S.p.A., Milan, Italy

[21] Appl. No.: 556,981

[22] Filed: Dec. 1, 1983

[30] Foreign Application Priority Data

Feb. 16, 1983 [IT] Italy .............................. 19614 A/83

[51] Int. Cl.$^3$ .............................................. C08L 63/02
[52] U.S. Cl. .................................... 523/456; 523/400; 523/454; 523/455; 523/463; 525/454; 525/481; 525/489; 525/510; 525/528; 525/930; 428/375

[58] Field of Search ............... 525/489, 481, 510, 528, 525/395, 930, 454; 523/456, 454, 455, 463

[56] References Cited

FOREIGN PATENT DOCUMENTS 0008811  3/1980  European Pat. Off. ............ 525/395

Primary Examiner—Theodore E. Pertilla
Attorney, Agent, or Firm—Sidney B. Ring; Leon Zitver

[57] ABSTRACT

This invention relates to a composition comprising (1) a phenoxy resin and (2) at least two compositions selected from (a) phenolic resins, (b) melamine resins and (c) polyisocyanates; to the cured products thereof; and to an electrical conductor coated with said cured products.

19 Claims, No Drawings

PHENOXY RESINS AND USE THEREOF IN ELECTRIC INSULATION

This invention relates to an electrical insulation and to an insulated electrical conductor comprising a metallic wire and a homogeneous layer of insulation applied to the metal. This insulated electrical conductor is useful in coating windings of motors and/or electric transformers; the insulator comprises a phenoxy resin with a molecular weight higher than 10,000, cured with at least two substances chosen from the group consisting of phenolic resins, melamine resins or polyisocyanates, preferably blocked polyisocyanates.

In particular this invention refers to round and/or shaped wires covered with non-conductive material which are used in the production of motor windings and/or electric transformers.

The round and/or shaped wires with insulating material are commercially known as "Enamelled" wires. In the description of this invention the term "Enamelled wire" will be used to indicate round or shaped wires covered with a layer of insulating material.

The enamelled wires which are used for the windings of motors and/or electric transformers, must have specific characteristics to guarantee usage for long periods of time without problems.

The metallic part of the enamelled wire generally comprises a metal with a good electrical conductivity such as copper, aluminum and in certain cases silver. The coating on the metallic conductor should be free of breaks to eliminate short circuits which might appear in the windings at a later time.

The dielectric properties should be high even at elevated temperatures as well as at some particular ambient temperature such as the case where transformers operate in oil.

The electrical insulation should be free of breaks and the adhesion and mechanical properties must be such as not to create shorts during the windings operations of motors and/or transformers and after prolonged service.

The insulation should be easily removable from the enamelled wire parts which are connected to the apparatus terminals which in turn are connected to an electrical source.

Since enamelled wires are usually connected by tin soldering, the insulator must be removable without leaving any residual material during the soldering operation. In industrial practice, insulation materials have been responsible for many problems encountered during the enamelling operation.

Therefore, many resins used for enamelling are modified with various components such as polyesters, epoxies, vinyl or polyamide to improve their runnability. U.S. Pat. No. 4,129,678 describes a three layer coating operation. The first layer using a resin with good adhesion to metal, the second resin would have a good mechanical strength while the third would have excellent chemical resistance for use in hot oil. This procedure of modifying a resin as well as applying several coats is costly requiring the use of specialized personnel.

We have now prepared enamelled wires with the same or superior characteristics to those normally found commercially, simply by mixing a phenoxy resin with at least two other components chosen from the groups of phenolic resins, melamine resins, polyisocyanates, for example blocked with hydrogen containing compositions such as phenol, cresol, xylenols, caprolactam, benzyl alcohol, etc. and curing this mixture once it has been applied to the wire to be enamelled.

It is even more surprising since the resins used to obtain this mixture do not give satisfactory results if they are mixed in any binary combination.

As regards the principle characteristics of the present invention it is necessary to mix a phenoxy resin which has a molecular weight higher than 10,000 with at least two other resin types as described herein to obtain enamelled wires with acceptable mechanical, chemical, thermal and metal adhesion properties.

Regarding another characteristic of this invention, the ratio between the weight of the phenoxy resin and the sum of weight of the other resins used, should be between 100 to 5 and 100 to 100, such as from 100 to 5 and 100 to 50, but preferably 100 to 5 and 100 to 25.

The term phenolic resin is intended to mean condensation products obtained with formaldehyde and a phenol type material such as phenol, cresol and their higher monophenol homologues. Another characteristic of this invention is that the mixture of phenoxy resin with the other resins is made by way of an organic solvent such as phenols, (which preferably constitute at least 50% by weight of the solvent) aromatic hydrocarbons, aliphatic and aromatic alcohols, aliphatic, aromatic or cycloaliphatic ketones, aromatic or aliphatic esters, glycol ethers, e.g., glycol ether esters or any combinations.

The preferred form in the present invention is a solution of organic solvents and the mixture of the phenoxy resin and other resins. This applied to clean and greaseless wires which are to be enamelled with normal methods of use for this type of application; for example closed or open dies, rollers, moist felts, and immersion baths.

PHENOXY RESINS

The phenoxy resins of this invention have repeating units of the general formula

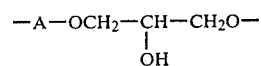

where A is an aromatic diol, preferably where A has 2 phenolic rings and the diol is a phenolic diol for example Bisphenol-A. The commercial resin is made according to the equation:

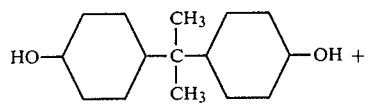

Bisphenol A

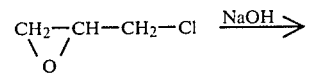

epichlorohydrin

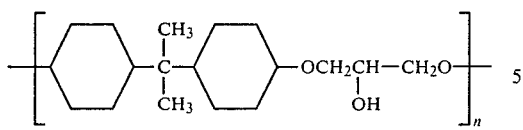

Phenoxy Resin yielding a molecular weight of at least about 10,000 such as about 10,000 to 500,000, but preferably about 100,000 to 300,000.

PKHH Phenoxy Resin sold by Carbide has a molecular weight of about 150,000.

PHENOLIC RESINS

It is well known that phenolic resins are formed by the reaction of a polyfunctional (di-, tri-, tetra-, etc.), material with a material (also polyfunctional) which supplies a bridging or linking radical, for example ketones, aldehydes, etc. Thus, in the production of phenol-aldehyde resins, the phenol may be trifunctional as with phenol, difunctional as with a hydrocarbon-substituted phenol such as p-ter-butyl-phenol or tetrafunctional as with certain bis-phenols. The aldehyde serves to supply the bridging methylene radical.

These can readily be selected from the general class of heat-hardenable phenol-aldehyde resins. The phenolic portion of the resin may be phenol, cresol, xylenols, mixtures of xylenols, cresols, wood-oil; phenolic bodies, petroalkyl phenols, coal tar phenols and others. The aldehyde portion of the resins may be formaldehyde, acetaldehyde or other suitable aldehydes. The preferred composition of phenol-aldehyde resin is obtained by reacting one mole of the phenolic compound, for example cresylic acid, with 1–2.0 M of formaldehyde. Suitable phenols include the following:

Para-, meta- and orthocresols; para-, meta- and orthoethyl-phenol; 3-methyl-4-ethyl-phenol; 3-methyl-4-propylphenol; 2-ethyl-3-methyl-phenol; 2-propyl-3-methylphenol; para- and ortho-propyl-phenol; para-tertiary-butyl-phenol; para-secondary-butyl-phenol; para-tertiary-amyl-phenol; para-secondary-amyl-phenol; para-tertiary-hexyl-phenol; paraisooctyl-phenol; ortho-phenol-phenol; paraphenyl-phenol; thymol; ortho-benzyl-phenol; para-benzyl-phenol; para-cyclohexyl-phenol; para-tertiary-decyl-phenol; para-dodecyl-phenol; para-tetradecyl-phenol; para-octadecyl-phenol; para-nonyl-phenol; para-menthyl-phenol; para-eicosanyl-phenol; para-docosanyl-phenol; para-tetracosanyl-phenol; para-beta-naphthyl-phenyl; para-alpha-napthyl-phenol; para-pentadecyl-phenol.

Tri- and tetrafunctional phenols can also be employed, for example those derived from bisphenol, as exemplified by the following:

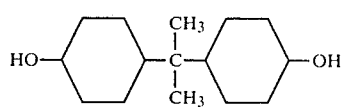

Bisphenol-A

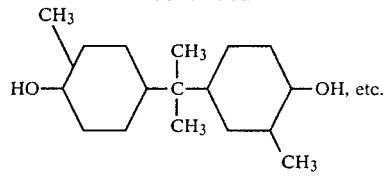

Bisphenol-C

MELAMINE RESINS

The melamine resins of this invention are melamine-aldehyde and modified melamine-aldehyde resins, for example etherified melamine-aldehyde resins. Included within the term melamine resins are benzoguanamine resins.

Melamine resins which may be used in the present invention can be selected from the general class of resinous aldehyde condensation products of melamine which are soluble in the organic liquids employed as solvents for the resinous components of the enamel. The useful melamine compounds include such derivatives of melamine as melam and melem. The aldehyde condensation products are well known and may be formed by reacting from 1–6 mols of the aldehyde with 1 mol of melamine. The solubility of the melamine-aldehyde condensation product is generally obtained by further reacting the condensation product with an alcohol or by co-condensing the melamine and aldehyde in the presence of an alcohol.

The aldehydes which may be used are aliphatic, aromatic, cyclic and heterocyclic aldehydes including formaldehyde, acetaldehyde, propionaldehyde, butyraldehyde, isobutryaldehyde, valeraldehyde, octaldehyde, benzaldehyde, cinnamaldehyde, cyclohexanone, furfural, etc.

The etherification of the methylol groups of the melamine-formaldehyde derivative is conventionally undertaken by condensing said derivative with an alcohol, e.g. methanol or butanol, in the presence of an acid catalyst.

Melamine with varying methylol contents in which the hydroxyl groups are in the free or non-etherified state provide excellent properties. Speed of condensation or cure response in the case of the etherfied methylol group increases with increasing volatility of the alcohol used in the synthesis of the aminoplast. Methanol is more volatile than n-butanol, and those crosslinkers, with methanol as the etherifying agent cush as hexamethoxymethylmelamine, have a faster response than those with butanol.

In addition to hexamethoxymethylmelamine (HMMM), various other commercially available triazine derivatives were tested. They included the Resimene (sold by Monsanto); Cymel (sold by American Cyanamid) and Uformite (sold by Rohm and Haas). Resimene are amino resins and include products which are derived from the reaction of melamine, formaldehyde, and either n-butanol, isobutanol or methanol. Resimene 730 and 740 are methylated melamines; Resimene 755 is a mixed ether (methyl and butyl) melamine, as is Resimene 764. Resimene 760 is a butylated melamine. Cymel is a trademark for a series of melamine-formaldehyde resin products. Cymel 350 is a methylated monomeric melamine-formaldehyde product, while Cymel 1116 is a methylated-ethylated-monomeric melamine-formaldehyde product. Cymel 370 and Cymel 380 are both polymeric melamine-formaldehyde products which have been methylated but still contain high methylol content. Cymel 1123 is a monomeric benzoguanamine-formaldehyde adduct which has been methylated and ethylated, while Cymel 1125 is the polymeric counterpart of 1123; both Cymel 1123 and 1125 contain very low methylol content.

POLYISOCYANATES

The blocked polyisocyanates used herein are those which on heating yield a free polyisocyanates which are available in various commercial forms such as those sold under the Mondur or Desmondur name. Examples of such materials may be found in U.S. Pat. No. 2,982,665.

Although one is able to employ polyisocyanates as such, in practice one employs blocked polyiosocyanates for best results.

They may be described as adducts of organic polyisocyanates, having the isocyanate group's reactive hydrogen blocked by another organic compound. The adduct portion of the polyurethane is removed by the elevated temperatures of the cure reaction, permitting the remaining polyisocyanate to cross-link the resinous composition.

Suitable polyisocyanates include compounds such as phenylene diisocyanates, diphenylene diisocyanates, tolylene diisocyanates, naphthylene diisocyanates, diphenyl-methane diisocyanates, cyclohexane diisocyanates, ethylene diisocyanate, tetramethylene diisocyanate, hexamethylene diisocyanate, polyaryl polyisocyanates, trimers of polyisocyanates, polyisocyanates which are the reaction products of diisocyanates or triisocyanates with polyhydric alcohols, and the like, and mixtures, trimers and isomers thereof. The simplest class of useful polyisocyanates can be represented by the following formula:

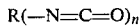

where R represents a member of the class consisting of aliphatic hydrocarbons containing up to 8 carbon atoms, aromatic hydrocarbons containing up to 6 carbon atoms, and alkyl-aryl substitutes thereof, and n is an integer from 2-4.

Typical trimers of the useful polyisocyanates can be illustrated by the following general formula:

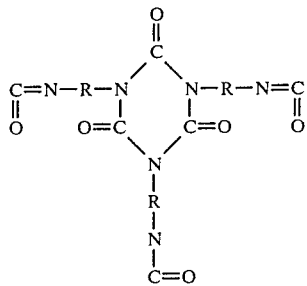

where R is the same as defined in the above formula for the polyisocyanates. Typical examples of the reaction products of polyisocyanates with polyhydric alcohols can be illustrated by the following general formula:

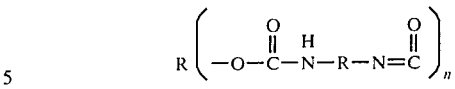

where R is the same as defined in the above formula for the polyisocyanates and n is an integer from 2-10. Suitable reactive hydrogen-containing compounds combining with the polyisocyanates to form the desired polyurethanes include phenols such as phenol, cresol, xylenols, etc., secondary aromatic amines, alcohols (mono- and polyfunctional) including enols, amides including lactams, mercaptans, and the like. Mixtures thereof can also be used to block the polyisocyanates. The preferred blocking agents are compounds with the hydroxyl group attached to the aromatic ring.

The wire coated with the resin solution is then treated with heated air at a temperature between 250° C. and 600° C., preferably 350° C.-550° C. for a time between 1/10 second to 30 seconds. This eliminates the solvents by way of evaporation and hardens the resin mixture.

The application treatment is repeated several times to obtain an insulating layer of the desired thickness on the conductor.

An advantage of the present invention is that the raw materials are commercially available and it is only necessary to mix them and not to react them. Also the solids content is higher than resins with comparable properties even at the same viscosities.

This characteristic is particularly important because it greatly reduces the number of applications to obtain the same thickness of insulator of the enamelled wires by processes in use and reduces the solvent volume to be evaporated or recuperated resulting in great energy savings.

Another advantage of the enamelled wires according to the invention, consists of the fact that the sum of the properties, such as mechanical, chemical, thermal and insulator adhesion, allows the thickness-reduction of insulated parts of enamelled wire compares to those well known, without altering the properties. According to another invention characteristic, the resin mixture is dissolved in an organic solvent, including phenol compounds, aromatic hydrocarbons, aromatic and aliphatic alcohols, aromatic cycloaliphatic and aliphatic ketones, glycol ethers, glycol ether esters, and mixtures of all. The diameter of the wires and dimensions of the rectangular wires, suitable to be enamelled with the present invention procedures, can be varied within quite wide limits, but the invention has revealed it is particularly useful for wires having diameters between 1/100 of mm. and 5 mm. and for metal strips having a thickness of between 1 and 6 mm and a width from 2 to 40 mm.

The homogeneous layer of insulator obtained on the enamelled wire operating according to the invention, can vary between 2 to 200 microns thickness, even though the ideal preparation for enamelled wires is with an insulating thickness between 10 and 60 microns.

Insulator thickness lower than 2 microns does not guarantee a satisfactory insulation for the metallic conductor even for very thin wire diameters, while insulator thicknesses higher than 200 microns are completely useless, due to the fact dielectric, mechanical and chemical resistance properties do not improve. The viscosity of the solutions of resins used for the enamelling of wires is normally maintained around 3000 cps. (at 25° C.). At this viscosity value, the solids content of Formvar solutions normally are lower than 25% in weight while according to the present invention the solids content can go up to 60%. Typically a solution of mixtures of resins according to the present invention has a solids content higher than 30% in weight, when the viscosity of the solution is around the value of 3000 cps. (at 25° C.).

It is preferred that the solids contents are between 25% and 40% by weight. Less solids contents are normally possible but for economic reasons it is better to have the solids contents above 20% and preferably above 30%.

The higher solids contents of this invention permits insulation coatings with a single build superior to that previously obtained with polyvinylformal.

According to a preferred form of this invention, the metallic conductor, after being coated with the solution of mixture of resins is treated with hot air to eliminate the solvent and cure the insulating layer in two stages with different temperatures.

In the first stage, the hot-air temperature is between 250° C. and 450° C. and the second stage of between 450° C. and 550° C.

Proceeding in this way allows us to obtain the best results in forming the insulating layer, especially for adhesion of the insulation layer to the conductor and for compactness of the insulator.

As preferred by the invention, the insulating layer of required thickness, is obtained by way of more successive cycles of coating of the wire with the solution of the mixture of resins, elimination of solvent and the hardening of mixture of resins in two stages using hot-air at different temperature.

The examples which follow better illustrate with the scope of this invention its wide usage without limiting to specific examples.

In all examples, the methods for standard tests of the International Electro-technical Commission (IEC) were utilized.

EXAMPLE 1

An instrument for the treatment of metallic conductors was used, consisting of an applicator containing the solution of resins to be applied to the conductor.

Dies to calibrate the quantity of solution left on the metallic wire after leaving the applicator thereby eliminating excess solution.

A horizontal MAG oven of the type LDOII/K-2V with a length of 3.2 M, with two zones where it was possible to maintain different air temperatures in circulation.

The operative oven conditions for all tests in this and other examples are as follows:
First Zone: air at 390° C.
Second Zone: air at 510° C.

A copper wire annealed at 410° C. of 1 mm. diameter was passed through the oven at a speed of 8 mm/min.
The applicator contained:
230 parts by weight of an organic solvent consisting of m-Cresol (50%), phenol (20%) and Solvesso 100 (30%), and in this was dissolved 100 parts by weight of PKHH resin (phenoxy resin produced by Union Carbide having a molecular weight of about 150,000), 110 parts by weight of cresylic resin 773.009 (cresylic resin m-p-cresol-formaldehyde resin with 45% solids in cresylic acid solvent) and 36 parts by weight of a melamine formaldehyde resin 775.019 (Melamine formaldehyde resin with 55% solids in xylol-isobutanol solvent).

The solution in the applicator had a viscosity of 3,000 cps. (at 25° C. and solids content of 36%.

The copper wire passed through the applicator, through the die and through the oven 5 times, until an enamelled wire was produced with an insulating layer equal to a total of 70 microns (total increase).

The coated wire underwent a series of tests according to IEC rules.

The results of the tests are listed in table 1.

EXAMPLE 2

With the operative conditions described in example 1, a copper wire annealed at 410° C. and diameter of 1 mm; was passed through the oven at a speed of 8 M/min.

The applicator contained:
240 parts by weight of organic solvent consisting of m-cresol (65%), phenol (25%) and Solvesso 100 (10%) and in this was dissolved 100 parts by weight of PKHH resin (phenoxy resin about 150,000 M.W. produced by Union Carbide), 7 parts by weight of cresylic resin 773.009 (cresylic resin with 45% solids in cresylic acid solvents) and 6 parts by weight of melamine formaldehyde resin 775.019 (melamine formaldehyde resin with 55% solids in xylol-isobutanol).

The solution in the applicator had a viscosity of 3000 cps. (at 25° C.) and a solids content of 30%.

The copper wire passed through the applicator through the die and through the oven 6 times, until it produced an enamelled wire with an insulating layer equal to a total of 70 microns (total increase).

The obtained wire underwent a series of tests according to IEC rules.

The results of the tests are listed in table 1.

EXAMPLE 3

With the operative condition described in example 1, a copper wire annealed at 410° C. and with diameter of 1 mm was passed through the oven at a speed of 8 M/min.

The applicator contained: 230 parts by weight of an organic solvent, consisting of m-Cresol (50%) phenol (35%) and xylol (15%) and in this was dissolved 100 parts by weight of PKHH resin (phenoxy resin about 150,000 M.W. produced by Union Carbide), 62 parts by weight of cresylic resin 5986 (cresylic resin with 44% solids in cresylic acid solvents), 24 parts by weight of melamine formaldehyde resin 775.019 (a melamine formaldehyde resin with 55% solids in xylol-isobutanol solvent), and 20 parts by weight of Desmondur AP Stabil* (polyisocyanate blocked with phenol produced by Bayer).

*Desmondur AP Stabil is a blocked cyclic trimer of a diisocyanate of the type described in U.S. Pat. No. 2,952,665.

The solution in the applicator had a viscosity of 3000 cps (at 25° C.) and a solids content of 37%.

The copper wire passed through the applicator through the die and through the oven 5 times, until it produced an enamelled wire with an insulation layer equal to a total of 70 microns (total increase).

The obtained wire underwent a series of tests according to IEC rules.

The results of the tests are listed in table 1.

EXAMPLE 4

(For comparison using Formvar* and no phenoxy)

With the same operative conditions described in example 1, a copper wire annealed at 410° C. and with diameter of 1 mm. was passed through the instrument at a speed of 7 M/min.

*Formvar is a polyvinylformal resin

The applicator contained:

570 parts by weight of an organic solvent, consisting of m-Cresol (50%), phenol (30%) and xylol (20%) and in this was dissolved 100 parts by weight of Formvar resin 15/95-E (a polyvinylformal produced by Monsanto), 32 parts by weight of cresylic resin 773.009 (cresylic resin with 45% solids in cresylic acid solvents), 5 parts by weight of melamine formaldehyde resin 775.019 (melamine formaldehyde resin with 55% solids in xylol-isobutanol solvent) and 50 parts by weight of Desmondur AP Stabil (a polyisocyanate blocked with phenol, produced by Bayer). The solution in the applicator had a viscosity of 3000 cps. (at 25° C.) and solids content of 22%.

The copper wire passed through the wetting bath, through the die and through the oven 7 times, until it produced an enamelled wire with an insulating layer equal to a total of 70 microns (total increase).

The obtained wire underwent a series of tests according to IEC rules.

The results of the tests are listed in table 1.

EXAMPLE 5

(For comparison using Formvar and no phenoxy)

With the same operative conditions described in example 1, a copper wire annealed at 410° C. and with diameter of 1 mm was passed through the instrument at a speed of 7 M/min.

The applicator contained:

700 parts by weight of an organic solvent consisting of m-Cresol (50%), phenol (30%) and xylol (20%) and in this was dissolved 100 parts by weight of Formvar 15/95-E resin (a polyvinylformal resin produced by Monsanto), and 110 parts by weight of cresylic resin 773.009 (Cresylic resin with 45% solids in cresylic acid solvents).

The solution in the applicator had a viscosity of 3000 cps. (at 25° C.) and solids content of 16%.

The copper wire passed through the wetting bath, through the die and through the oven 8 times, until producing an enamelled wire with an insulating layer equal to a total of 70 microns (total increase).

The obtained wire underwent a series of tests according to the IEC rules.

The results of the tests are listed in table 1.

EXAMPLE 6

(For comparison using Formvar and no phenoxy resin)

With the same operative conditions described in example 1, a copper wire annealed at 410° C. and with a diameter of 1 mm was passed through the instrument at a speed of 7 M/min.

The applicator contained:

580 parts by weight of an organic solvent constituted by m-Cresol (40%), phenol (35%) and xylol (25%) and in this was dissolved 100 parts by weight of Formvar 7/95 - E resin (A polyvinylformal resin produced by Monsanto), 35 parts by weight of cresylic resin 773.009 (cresylic resin with 45% solids in cresylic acid solvents) and 6 parts by weight of a melamine formaldehyde resin 775.019 (melamine formaldehyde resin 775.019; a melamine formaldehyde resin with 55% solids in xylol-isobutanol solvent) and 70 parts by weight of Desmondur AP Stabil (polyisocyanate blocked with phenol produced by Bayer).

The solution in the applicator had a viscosity of 3000 cps. (at 25° C.) and a solids content of 24%.

The copper wire passed through the wetting bath, through the die and through the oven 7 times, until it produced an enamelled wire with an insulating layer equal to a total of 70 microns (grade 2).

The obtained wire underwent a series of tests according to IEC rules.

The results of the tests are listed in table 1.

TABLE 1

|  | Test |  | Ex. 1 | Ex. 2 | Ex. 3 | Ex. 4 | Ex. 5 | Ex. 6 |
|---|---|---|---|---|---|---|---|---|
| FINISHED CHARACTERISTICS | | | | | | | | |
| SOLIDS CONTENT | 2 gr × 3 h × 150° C. | % | 36% | 30% | 37% | 22% | 16% | 24% |
| VISCOSITY | Brookfield | Cps at 25° C. | 3,000 | 3,000 | 3,000 | 3,000 | 3,000 | 3,000 |
| PERFORMANCE | | | | | | | | |
| MECHANICAL: | | | | | | | | |
| FLEXIBILITY | IEC 251-1-8.1-1978 | OK 1X - % ALL | 15% | 35% | 20% | 15% | 20% | 25% |
| ADHERENCE | IEC 251-1-8.3-1978 | VISUAL | OK | OK | OK | OK | OK | OK |
| PEEL TEST | IEC 251-1-8.4-1978 | NUMBER TURNS | 130 | 170 | 145 | 125 | 140 | 100 |
| ABRASION | IEC 251-1-11-1978 | g. | 2,000 | 1,600 | 1,850 | 1,750 | 1,800 | 1,600 |
| THERMAL: | | | | | | | | |
| THERMAL CLASS | IEC-172 | °C. | 120 | 120 | 120 | 120 | 105 | 120 |
|  | ASTM D 2307-68 | | | | | | | |
| TARGENT DELTA | IEC 251-1.19-1978 | °C. | 115 | 115 | 115 | 115 | 105 | 115 |
| CUT THROUGH | IEC 251-1.10-1978 | °C. | 280 | 250 | 275 | 275 | 250 | 275 |
| HEAT SHOCKS 1 TIME DIAMETER | IEC 251-1.9-1978 | °C. | 250 | 240 | 250 | 175 | 175 | 175 |
| 30 MINUTES | | | | | | | | |
| SOLDERABILITY | IEC 251-1-17-1978 | °C. | 485 | 470 | 470 | 510 | 510 | 510 |
| ELECTRICAL: | | | | | | | | |
| DIELECTRICS | IEC 251-1-13-1978 | KV | 11 | 10.5 | 10.5 | 8.5 | 7.5 | 8.5 |
| CHEMICAL: | | | | | | | | |
| RESISTANCE TO SWELLING AND SOFTENING AGED IN TRANSFORMER OIL (168 h. × 150° C.) | IEC 251-1-12-1978 | PENCIL HARDNESS | 2H | 2H | 2H | 4H | 4H | 4H |
| FLEXIBILITY | IEC 55-225 (C.O.) | φ | 1 | 1 | 1 | 3 | 3 | 3 |
| AT 105° C. IN OIL | IEC 55-225 (C.O.) | KV | 9.5 | 8.5 | 8.5 | 0.8 | 0.8 | 0.8 |
| APPLICATION CHARACTERISTICS: | | | | | | | | |
| ELONGATION | | APPEARANCE | OK | OK | OK | OK | OK | OK |
| NUMBER OF PASSES TO GET 70 | | | 5 | 6 | 5 | 7 | 8 | 7 |
| MICRONS on 0.1 mm WIRE SPEED | | m/min. | 8 | 8 | 8 | 7 | 7 | 7 |

We claim:

1. A composition comprising at least one organic solvent and a mixture of resins consisting essentially of (1) a phenoxy resin and (2) at least two resin components selected from the group consisting of (a) phenolic resins, (b) melamine resins and (c) polyisocyanates.

2. The composition of claim 1 containing a polyisocyanate and said polyisocyanate is a blocked polyisocyanate.

3. The composition of claim 1 where the weight ratio of the phenoxy resin to the total weight of the other resin components is between 100 to 5 and 100 to 100.

4. The composition of claim 3 containing a polyisocyanate and said polyisocyanate is a blocked polyisocyanate.

5. The composition of claim 1 where the weight ratio of the phenoxy resin to the total weight of the other resin components is between 100 to 5 and 100 to 50.

6. The composition of claim 1 where the weight ratio of the phenoxy resin to the total weight of the other resin components is between 100 to 5 and 100 to 25.

7. The composition of claim 1 wherein said mixture of resins constitutes between 25% and 40% by weight of the composition.

8. The composition of claim 3 wherein said mixture of resins constitutes between 25% and 40% by weight of the composition.

9. The composition of claim 5 wherein said mixture of resins constitutes between 25% and 40% by weight of the composition.

10. The composition of claim 6 wherein said mixture of resins constitutes between 25% and 40% by weight of the composition.

11. The composition of claim 3 wherein the phenoxy resin has a molecular weight higher than 10,000 and the polyisocyanate component is a polyisocyanate blocked with at least one member of the group consisting of phenols, secondary aromatic amines, alcohols, amides and mercaptans.

12. The composition of claim 11 wherein said polyisocyanate is blocked with at least one member of the group consisting of phenol, cresol, xylenols, caprolactam and benzyl alcohol.

13. The composition of claim 12 which has a solids content higher than 30% by weight and a viscosity of about 3000 cps at 25° C.

14. The composition of claim 13 wherein the organic solvent contains at least one member of the group consisting of phenols; aromatic hydrocarbons; aliphatic and aromatic alcohols; aliphatic, aromatic and cycloaliphatic ketones; aromatic and aliphatic esters; and glycol ethers.

15. The composition of claim 14 wherein the organic solvent contains at least 50% by weight phenols.

16. The cured product of claim 1.
17. The cured product of claim 3.
18. The cured product of claim 2.
19. The cured product of claim 4.

* * * * *